US012646985B2

(12) United States Patent
Tanaka et al.

(10) Patent No.: US 12,646,985 B2
(45) Date of Patent: Jun. 2, 2026

(54) ROTOR AND IPM MOTOR

(71) Applicant: NIDEC CORPORATION, Kyoto (JP)

(72) Inventors: Yosuke Tanaka, Kyoto (JP); Takeshi Honda, Kyoto (JP); Hirofumi Muto, Kyoto (JP); Hideki Tsuji, Kyoto (JP); Yuya Danjo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 192 days.

(21) Appl. No.: 18/565,065

(22) PCT Filed: May 10, 2022

(86) PCT No.: PCT/JP2022/019745
§ 371 (c)(1),
(2) Date: Nov. 28, 2023

(87) PCT Pub. No.: WO2023/026597
PCT Pub. Date: Mar. 2, 2023

(65) Prior Publication Data
US 2024/0204595 A1 Jun. 20, 2024

(30) Foreign Application Priority Data
Aug. 24, 2021 (JP) ................................. 2021-136634

(51) Int. Cl.
*H02K 1/27* (2022.01)
*H02K 1/276* (2022.01)

(52) U.S. Cl.
CPC ................................... *H02K 1/276* (2013.01)

(58) Field of Classification Search
CPC . H02K 1/276; H02K 1/22; H02K 1/27; Y02T 10/64
See application file for complete search history.

(56) References Cited

U.S. PATENT DOCUMENTS

| | | | |
|---|---|---|---|
| 2020/0106314 A1* | 4/2020 | Schulde | H02K 1/276 |
| 2021/0234419 A1 | 7/2021 | Okazaki et al. | |

FOREIGN PATENT DOCUMENTS

| | | | | |
|---|---|---|---|---|
| DE | 102005041676 A1 * | 3/2007 | ............. | H02K 1/276 |
| JP | 2019103173 A * | 6/2019 | ............... | H02K 1/27 |

(Continued)

OTHER PUBLICATIONS

"International Search Report (Form PCT/ISA/210) of PCT/JP2022/019745", mailed on Jul. 26, 2022, with English translation thereof, pp. 1-4.

*Primary Examiner* — Thomas Truong
(74) *Attorney, Agent, or Firm* — JCIPRNET

(57) ABSTRACT

A rotor includes a columnar rotor core, having multiple core plates laminated in a thickness direction and a magnet insertion hole extending in an axial direction; and a magnet inserted in the magnet insertion hole. The core plates have multiple first core plates. The first core plates are continuously laminated in the axial direction. Each of the first core plates includes a contact portion and a deformation permitting portion. The contact portion defines a portion of an inner surface of the magnet insertion hole and contacts with the magnet. The deformation permitting portion is located on an opposite side of the magnet with the contact portion in between when the first core plates are viewed in the thickness direction, and permits deformation of the contact portion. Multiple contact portions in the first core plates overlap at least partially when the rotor core is viewed in the axial direction.

13 Claims, 7 Drawing Sheets

(56)        References Cited

FOREIGN PATENT DOCUMENTS

| | | |
|---|---|---|
| JP | 2019146448 | 8/2019 |
| KR | 20040042035 | 5/2004 |
| WO | 2019064403 | 4/2019 |
| WO | 2020090086 | 5/2020 |

* cited by examiner

ROTOR AND IPM MOTOR

CROSS-REFERENCE TO RELATED APPLICATIONS

This is the U.S. national stage of application No. PCT/JP2022/019745, filed on May 10, 2022, and priority under 35 U.S.C. § 119(a) and 35 U.S.C. § 365(b) is claimed from Japanese Application No. 2021-136634, filed on Aug. 24, 2021; the disclosures of which are incorporated herein by reference.

TECHNICAL FIELD

The present invention relates to a rotor and an interior permanent magnet (IPM) motor.

BACKGROUND ART

In a rotor for an IPM motor in which a magnet is inserted into a magnet insertion hole, a configuration is known in which the magnet is fixed in the magnet insertion hole by a protrusion of the core plate. The related art discloses a rotor core composed of laminated electromagnetic steel plates having a magnet insertion hole.

In the rotor core, a first electromagnetic steel plate, which is at least one of the above-mentioned electromagnetic steel plates, protrudes partially toward the magnet insertion hole on the side of the magnet insertion hole and has a bendable protrusion in the axial direction by the permanent magnet inserted into the magnet insertion hole. The permanent magnet is fixed in the magnet insertion hole by the bending protrusion.

In a configuration where the magnet is held in the magnet insertion hole by a bending protrusion as in the configuration of Patent Document 1, the thickness of the protrusion should be strictly controlled with respect to the dimensions of the gap between the inner surface of the magnet insertion hole and the magnet inserted into the magnet insertion hole. In other words, the thickness of the protrusion should be thick enough to accommodate the protrusion within the gap and to hold the magnet between the inner surface of the magnet insertion hole and the magnet. Meanwhile, in a configuration in which a magnet is fixed by a portion of the core plate, a simple configuration that may hold the magnet in the magnet insertion hole is required.

SUMMARY

The rotor according to one embodiment of the present invention includes: a cylindrical rotor core, having multiple core plates laminated in a thickness direction and a magnet insertion hole extending in an axial direction, and a magnet inserted into the magnet insertion hole. The core plates include multiple first core plates. The first core plates are continuously laminated in the axial direction. Each of the first core plates includes: a contact portion, defining a portion of an inner surface of the magnet insertion hole and contacting the magnet; and a deformation permitting portion, located on an opposite side of the magnet with the contact portion in between when the first core plates are viewed in the thickness direction, and permitting deformation of the contact portion. Multiple contact portions of the first core plates are at least partially overlapped when the rotor core is viewed in the axial direction.

An IPM motor according to one embodiment of the present invention includes a rotor having the above configuration, and a stator having a stator coil and a stator core.

The above and other elements, features, steps, characteristics and advantages of the present disclosure will become more apparent from the following detailed description of the preferred embodiments with reference to the attached drawings.

DESCRIPTION OF EMBODIMENTS

Figure 1:
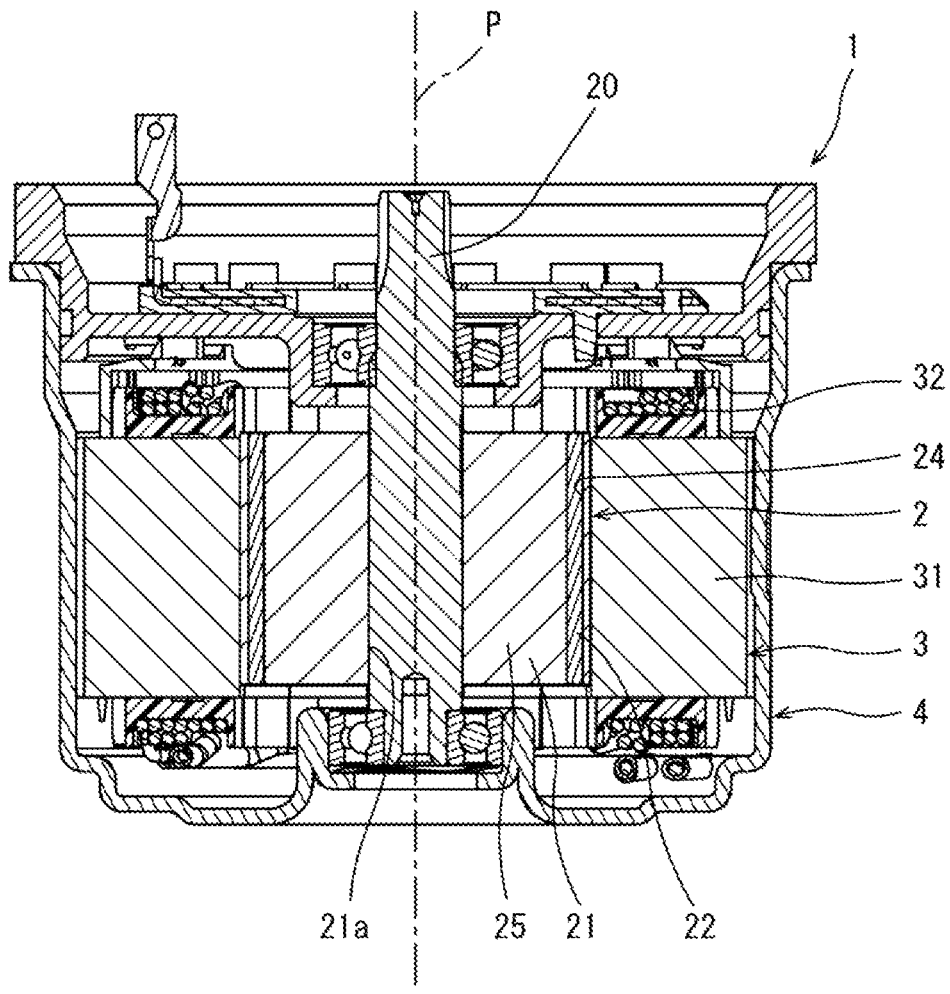
FIG. 1 is a cross-sectional view illustrating a schematic configuration of the IPM motor according to the first exemplary embodiment.

Hereinafter, exemplary embodiments of the present invention will be described in detail with reference to the drawings. In the figures, identical or corresponding portions are denoted by the same reference numerals and descriptions thereof will not be repeated. Further, the dimensions of the components in each figure do not faithfully represent the actual dimensions of the components or the dimensional ratios of each component.

In the following description of the motor 1, a direction parallel to the central axis P of the rotor 2 is referred to as the "axial direction," a direction perpendicular to the central axis P is referred to as the "radial direction," and a direction along an arc with the central axis P as the center is referred to as the "circumferential direction." However, these definitions are not intended to limit the orientation of the rotor 2 when used.

Furthermore, in the following description, "the same" does not only mean strictly the same but also includes a range that may be considered to be substantially the same.

In addition, in the following descriptions, expressions such as "fixing," "connecting," and "attaching" (hereinafter referred to as "fixing, etc.") include not only cases in which members are directly fixed, etc. to each other, but also cases in which they are fixed, etc. via other members. That is, in the following description, expressions such as fixing include direct and indirect fixation of members.

FIG. 1 illustrates a schematic configuration of the motor 1 according to the first exemplary embodiment. The motor 1 is an IPM motor. The motor 1 includes a rotor 2, a stator 3, a housing 4, and a shaft 20. The rotor 2 rotates with respect to the stator 3 with the central axis P as the center. In this embodiment, the motor 1 is a so-called inner rotor type motor in which the rotor 2 is rotatably located within the cylindrical stator 3 with the central axis P as the center.

The rotor 2 includes a rotor core 21 and a magnet 22. The rotor 2 is located at the radially inner side of the stator 3 and is rotatable with respect to the stator 3 with the central axis P as the center.

The stator 3 is housed in the housing 4. In this embodiment, the stator 3 is cylindrical. The rotor 2 is located at the radially inner side of the stator 3. That is, the stator 3 is located opposite the rotor 2 in the radial direction.

The stator 3 includes a stator core 31 and a stator coil 32. The stator coil 32 is wound around the stator core 31. A detailed description of the stator 3 will be omitted.

Figure 2:
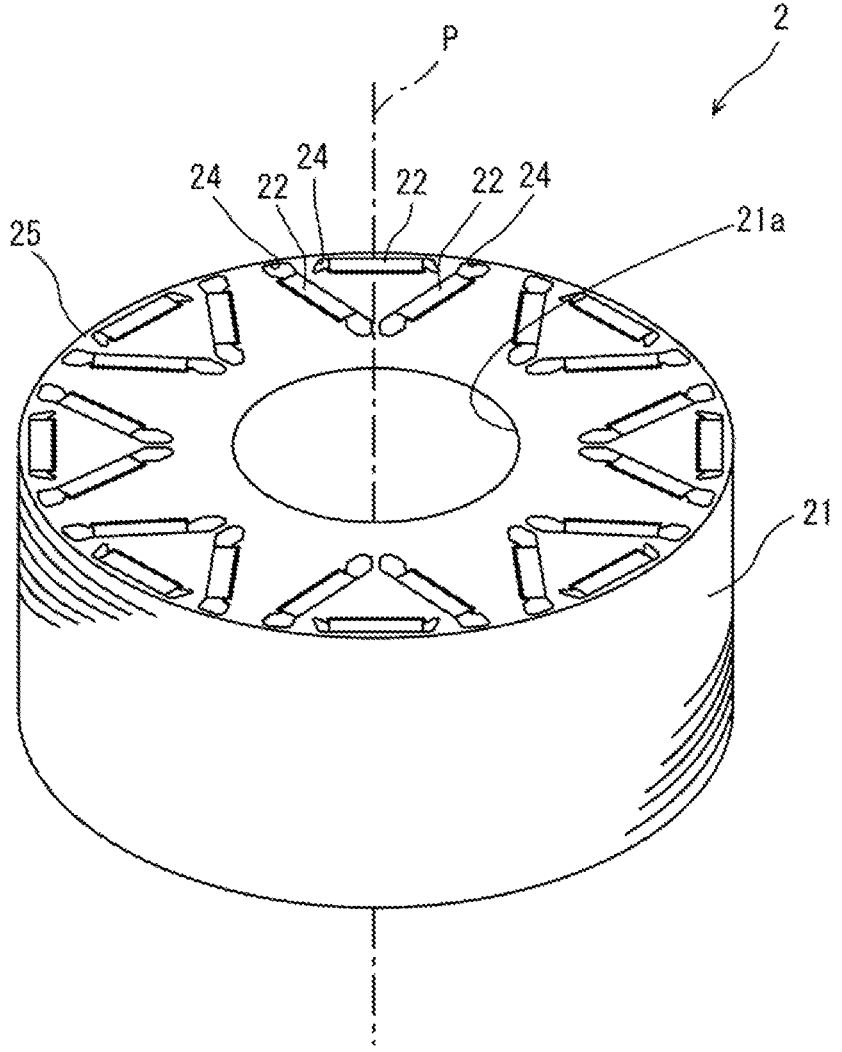
FIG. 2 is a perspective view of the rotor according to the first exemplary embodiment.

The rotor 2 will be described with reference to FIG. 2 to FIG. 7. As shown in FIG. 2, the rotor core 21 of the rotor 2 has a cylindrical shape extending along the central axis P. The rotor core 21 has a through hole 21a extending along the central axis P. As shown in FIG. 1, the rotor core 21 is fixed with the shaft 20 passing through the through hole 21a in the axial direction. As a result, the rotor core 21 rotates together with the shaft 20.

Figure 3:
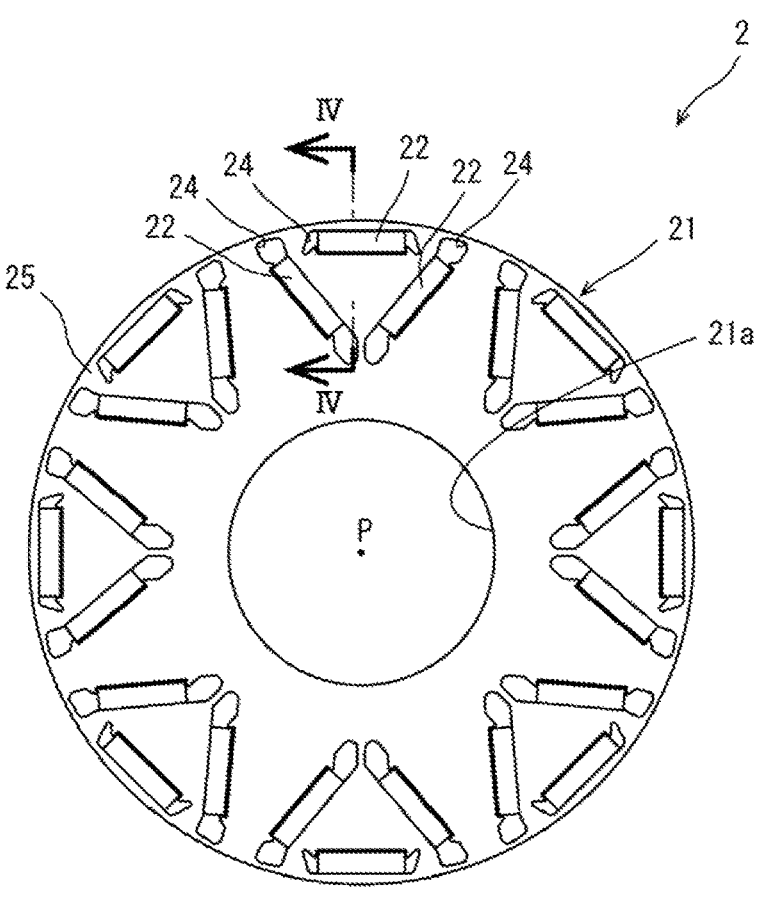
FIG. 3 is a plan view of the rotor.

As shown in FIG. 2 and FIG. 3, the rotor core 21 has multiple magnet insertion holes 24 located at predetermined intervals in the circumferential direction. The magnet insertion holes 24 penetrate the rotor core 21 in the axial direction. The magnet insertion holes 24 has a rectangular long shape in one direction when viewed in the axial direction. The magnet insertion holes 24 include a magnet insertion hole, whose longitudinal direction is along the outer circumference of the rotor core 21 when viewed in the axial direction, and a magnet insertion hole extending from the outer circumferential side in the radial direction to the inner circumferential side in the radial direction of the rotor core 21 when viewed in the axial direction. The magnet 22 is accommodated in the magnet insertion hole 24. It should be noted that the magnet insertion holes may include a magnet insertion hole extending in the radial direction of the rotor core when viewed from the axial direction.

The rotor core 21 has multiple disc-shaped core plates 25 defined in a predetermined shape and laminated in a thickness direction. The core plates 25 are electromagnetic steel plates.

The magnet 22 has a rectangular parallelepiped shape extending in the axial direction. The magnet 22 is inserted into the magnet insertion hole 24 from one side in the axial direction of the rotor 2 and is accommodated in the magnet insertion hole 24. The magnet 22 is fixed to the magnet insertion hole 24 by a contact portion 53 of a first core plate 50, which will be described later. Hereinafter, the direction of inserting the magnet 22 into the magnet insertion hole 24 is also referred to as the "magnet insertion direction."

Figure 4:
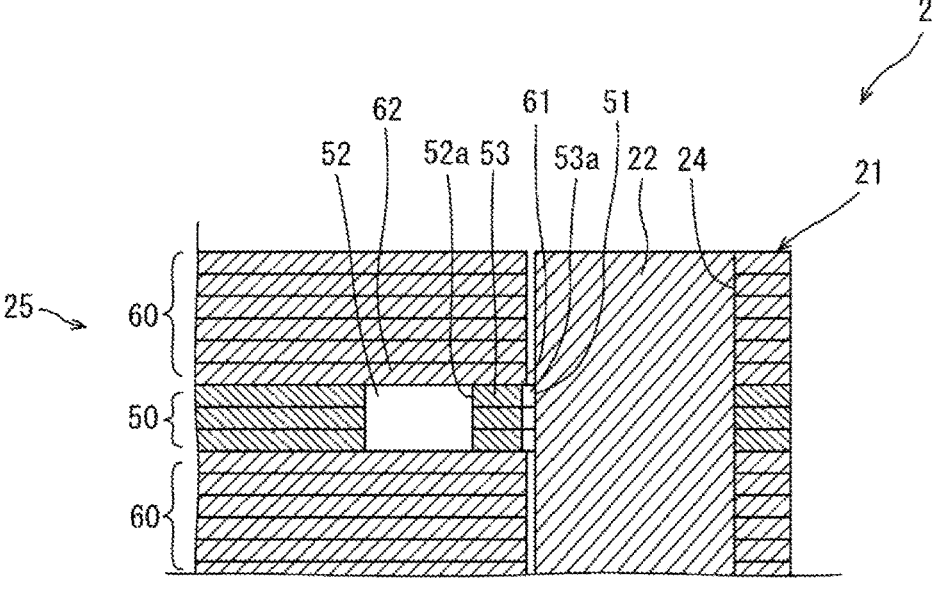
FIG. 4 is a cross-sectional view taken along the line IV-IV in FIG. 3.

FIG. 4 is a cross-sectional view taken along the line IV-IV in FIG. 3. As shown in FIG. 4, the rotor core 21 includes multiple core plates 25 laminated in the thickness direction. In this embodiment, the core plates 25 include first core plates 50 and second core plates 60. In this embodiment, the first core plates 50 are continuously laminated in the center in the axial direction of the rotor core 21. The second core plates 60 are laminated on the one side and other side in the axial direction with respect to the first core plates 50.

Figure 5:
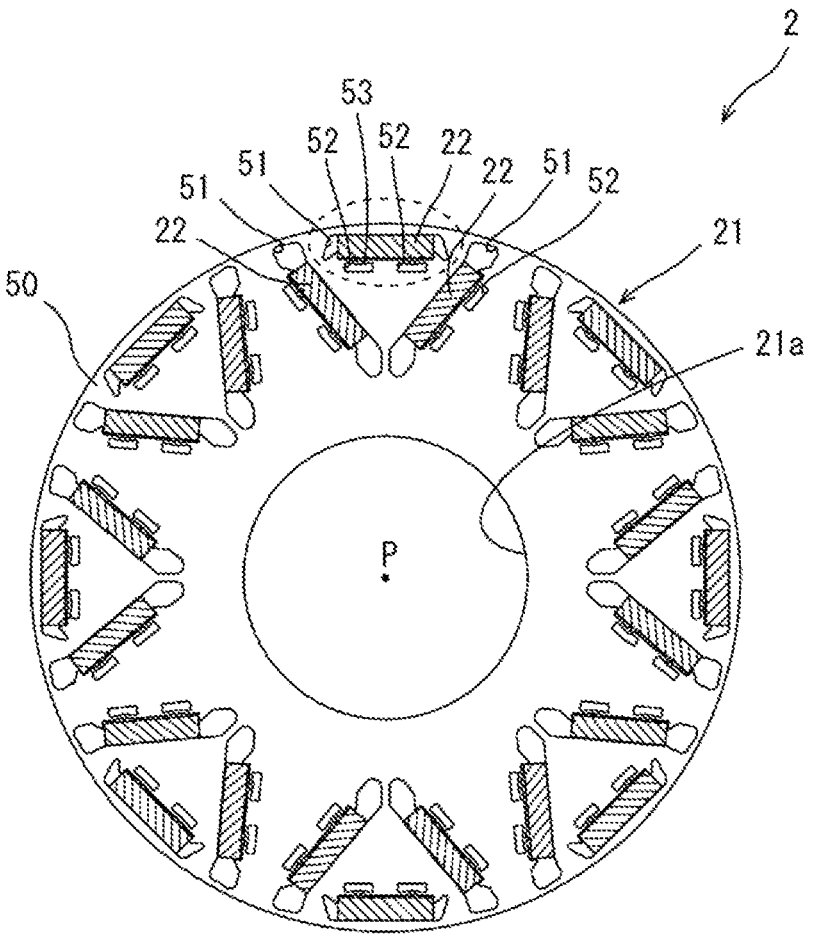
FIG. 5 is an axial direction view of the first core plate with a magnet inserted into the magnet insertion hole.

FIG. 5 is an axial direction view of the first core plate 50 with a magnet 22 inserted into the magnet insertion hole 24. As shown in FIG. 5, the first core plate 50 has multiple accommodation holes 51, multiple deformation permitting portions 52, and multiple contact portions 53.

In this embodiment, the first core plate 50 has two deformation permitting portions 52 and two contact portions

53 for one accommodation hole 51. The deformation permitting portions 52 are located at the radially inner side with respect to the accommodation hole 51. The contact portions 53 are located between the accommodation hole 51 and the deformation permitting portions 52.

The accommodation holes 51 included in the first core plate 50 has the same configuration. Further, the configurations of the deformation permitting portions 52 and the contact portions 53 for each of the accommodation holes 51 are the same. Thus, in the following, one accommodation hole 51, one deformation permitting portion 52 located at the radially inner side with respect to the accommodation hole 51, and one contact portion 53 located between the accommodation hole 51 and the deformation permitting portion 52 is described.

Figure 6:
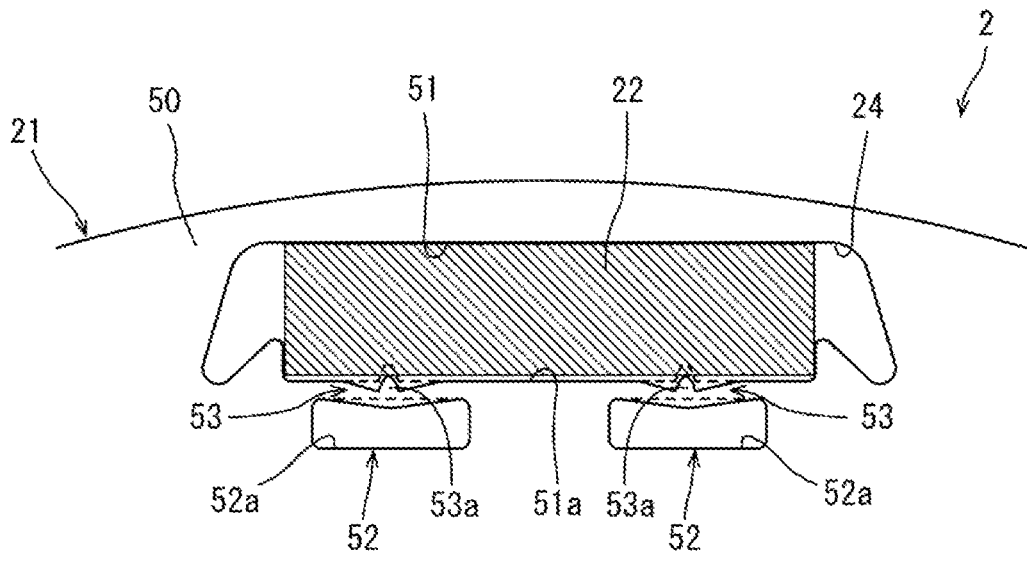
FIG. 6 is a partially enlarged view of FIG. 5.

FIG. 6 is an enlarged view of the portion indicated by broken line in FIG. 5. As shown in FIG. 6, the accommodation hole 51 has a long shape in one direction when the first core plate 50 is viewed in the axial direction. The accommodation hole 51 defines a portion of the magnet insertion hole 24 of the rotor core 21. The magnet 22 is located within the accommodation hole 51.

The deformation permitting portion 52 is located at the radially inner side with respect to the inner surface 51a, which includes one of a pair of inner surfaces extending in the longitudinal direction of the accommodation hole 51 when the first core plates 50 is viewed in the thickness direction. In this embodiment, the deformation permitting portion 52 has a through hole 52a that penetrates the first core plate 50 in the thickness direction. The through hole 52a has, for example, a rectangular shape.

The contact portion 53 is located between the accommodation hole 51 and the deformation permitting portion 52. That is, the contact portion 53 defines a portion of the inner surface 51a. In this embodiment, the contact portion 53 has a protrusion 53a that protrudes toward the interior of the magnet insertion hole 24 and contacts the magnet 22.

The contact portion 53 is pressed toward the deformation permitting portion 52 by the magnet 22 when the magnet 22 is inserted into the magnet insertion hole 24. Thus, with the magnet 22 inserted into the magnet insertion hole 24, the contact portion 53 is deformed toward the deformation permitting portion 52. As a result, the magnet 22 inserted into the magnet insertion hole 24 is pressed against the inner surface of the magnet insertion hole 24 on an opposite side of the contact portion 53, with the magnet 22 in between, by the elastic restoring force of the contact portion 53.

The contact portion 53 may be easily deformed in the arrangement direction of the contact portion 53 and the deformation permitting portion 52 through the through hole 52a of the deformation permitting portion 52. That is, the deformation permitting portion 52 may easily deform the contact portion 53 in the arrangement direction by having the through hole 52a.

As shown in FIG. 6, a length of the deformation permitting portion 52 is longer than that of the contact portion 53 in a crossing direction perpendicular to the arrangement direction of the contact portion 53 and the deformation permitting portion 52 when the rotor 2 is viewed in the axial direction. That is, two end portions of the deformation permitting portion 52 in the crossing direction are located outwardly from the two end portions in the crossing direction of the contact portion 53 when the rotor 2 is viewed in the axial direction. As a result, the contact portion 53 may be easily deformed in the arrangement direction.

In this embodiment, the contact portion 53 has a protrusion 53a protruding from the inner surface 51a of the accommodation hole 51 toward the interior of the magnet insertion hole 24. As a result, the tip of the protrusion 53*a* may be brought into contact with the magnet 22. That is, the area of the portion where the contact portion 53 contacts the magnet 22 is small. As a result, the contact portion 53 may be easily deformed toward the deformation permitting portion 52 by the magnet 22 inserted into the magnet insertion hole 24. In addition, since the area of the contact portion 53, which is the protrusion 53*a*, that contacts the magnet 22 is small, the force to hold the magnet 22 by the contact portion 53 may be increased.

As shown in FIG. 4, multiple first core plates 50 are continuously laminated in the axial direction of the rotor 2. In other words, as shown in FIG. 4, the contact portions 53 of the first core plates 50 are overlapped when the rotor core 21 is viewed in the axial direction. In this embodiment, three first core plates 50 are continuously laminated. It should be noted that two or more first core plates may be continuously laminated.

The deformation permitting portion 52 has a through hole 52*a* that penetrates each of the first core plates 50. The deformation permitting portions 52 of the first core plates 50 permit the contact portions 53 to deform within the through holes 52*a*, respectively, by having the through holes 52*a*, respectively. That is, when inserting the magnet 22 into the magnet insertion hole 24, the contact portions 53 may be easily deformed toward the deformation permitting portions 52.

Furthermore, the contact portions 53 are at least partially overlapped when the rotor core 21 is viewed in the axial direction. As a result, when inserting the magnet 22 into the magnet insertion hole 24, the contact portions 53 may be made less easily to deform in the magnet insertion direction.

That is, the contact portions 53 are easily deformed toward the deformation permitting portions 52 and less easily deformed in the axial direction by continuously laminating the first core plates 50 in the axial direction. In other words, when inserting the magnet 22 into the magnet insertion hole 24, the contact portions 53 may be deformed toward the deformation permitting portions 52 while suppressing the contact portions 53 from deforming in the axial direction.

Figure 7:
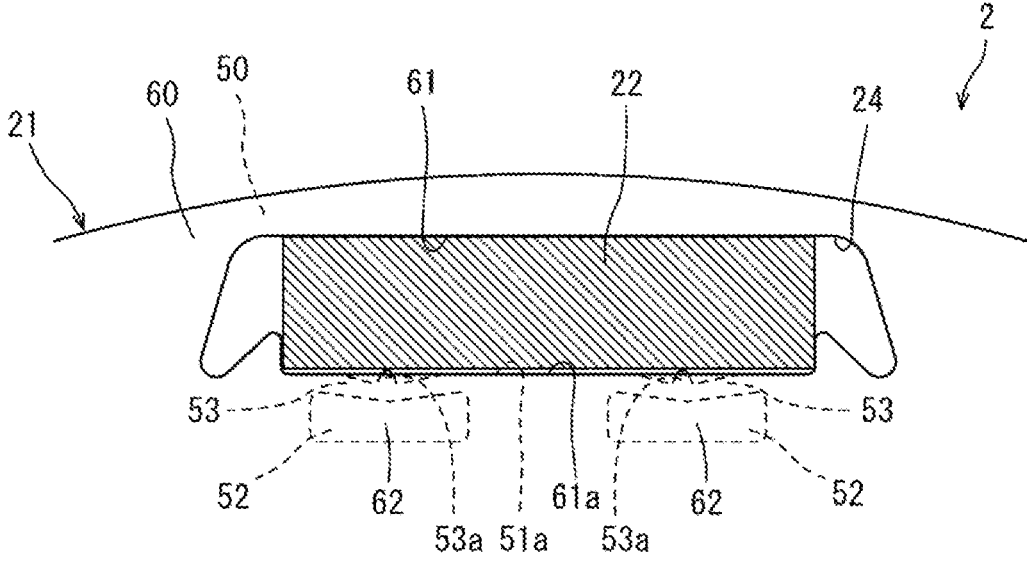
FIG. 7 is a view equivalent to FIG. 6 of the second core plate.

As shown in FIG. 4, the second core plates 60 are laminated on the one side and the other side in the axial direction with respect to the first core plates 50. FIG. 7 shows a view of the second core plate 60 laminated on the one side in the axial direction with respect to the first core plates 50 when viewed in the other side of the axial direction. FIG. 7 shows a portion of the second core plate 60 that overlaps with the first core plate 50 shown in FIG. 6 when the rotor core 21 is viewed from the axial direction. The second core plate 60 laminated on the one side in the axial direction of the first core plates 50 is described below. The second core plate 60 laminated on the other side in the axial direction of the first core plates 50 has a similar configuration. Thus, the description of the second core plate 60 laminated on the other side will be omitted.

The second core plate 60 has an accommodation hole 61 and a covering portion 62. The accommodation hole 61 defines a portion of the magnet insertion hole 24 of the rotor core 21. The magnet 22 is located within the accommodation hole 61. In the second core plate 60, the inner surface 61*a*, which defines the magnet insertion hole 24 on the inner surface 51*a* side in the first core plate 50, is not in contact with the magnet 22.

The covering portion 62 is located at a position overlapping the deformation permitting portions 52 of the first core plate 50 when viewed in the axial direction. That is, in the second core plate 60, the covering portion 62 covers the deformation permitting portions 52 of the first core plate 50 on the other side in the axial direction. As a result, the deformation permitting portions 52 of the first core plate 50 is suppressed from deforming in the axial direction of the rotor core 21. Furthermore, since the second core plate 60 covering the deformation permitting portions 52 is located on at least one laminating direction of the first core plate 50, the decrease in the strength of the rotor core 21 at the positions of the deformation permitting portions 52 of the first core plate 50 may be suppressed.

It should be noted that the second core plate 60 may be laminated on either the one side or the other side in the axial direction of the first core plate 50. That is, the core plates 25 have the second core plates 60 laminated on at least one laminating direction of the first core plates 50 with respect to the first core plates 50. The second core plate 60 has the covering portion 62 at a position overlapping the deformation permitting portions 52 of the first core plate 50 when viewed from the laminating direction of the first core plates 50. It should be noted that the second core plate 60 is exemplarily laminated on both the one side and the other side in the axial direction of the first core plate 50.

In this way, the second core plate 60 covers the deformation permitting portions 52 of the first core plate 50 in one side or the other side in the laminating direction by the covering portion 62. As a result, the deformation permitting portions 52 of the first core plates 50 are suppressed from deforming in the axial direction of the rotor core 21. Furthermore, since the second core plate 60 covering the deformation permitting portions 52 is located on at least one laminating direction of the first core plates 50, the decrease in the strength of the rotor core 21 at the position of the deformation permitting portion 52 of the first core plates 50 may be suppressed.

Figure 8A:
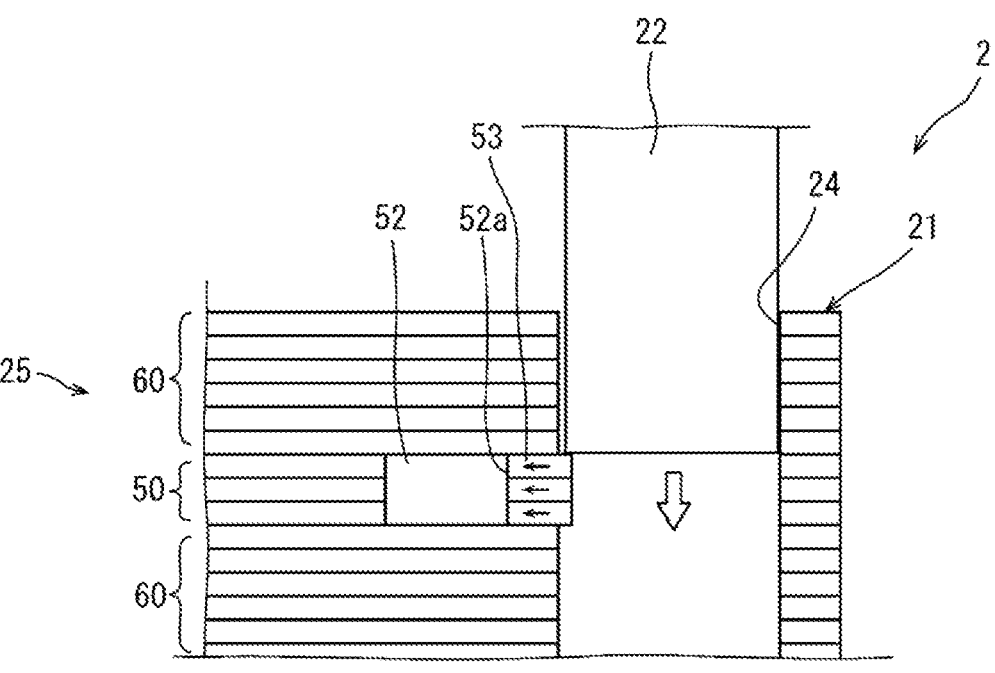
FIG. 8A illustrates a deformation of the contact portion when inserting the magnet into the magnet insertion hole.
Figure 8B:
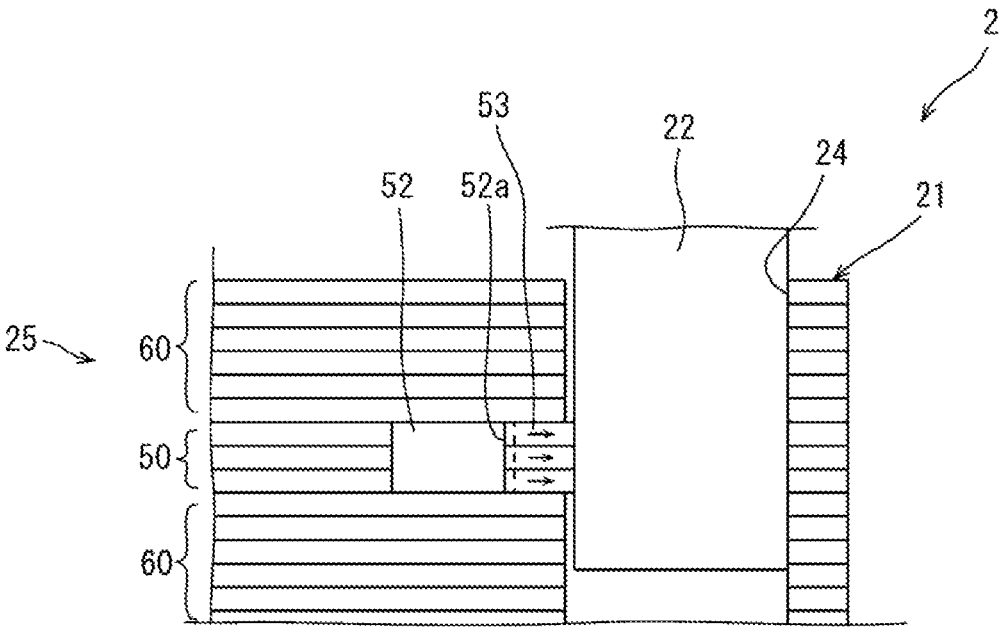
FIG. 8B illustrates a deformation of the contact portion when inserting the magnet into the magnet insertion hole.

Next, a method of fixing the magnet 22 by deforming the contact portion 53 is described with reference to FIG. 6, FIG. 8A, and FIG. 8B. As shown in FIG. 8A, when the magnet 22 is not inserted into the magnet insertion hole 24, the contact portion 53 protrudes toward the interior of the magnet insertion hole 24. The contact portion 53 is pressed toward the deformation permitting portion 52 by the magnet 22 when the magnet 22 is inserted into the magnet insertion hole 24. The contact portion 53 deforms toward the deformation permitting portion 52 by being pressed by the magnet 22, as shown in FIG. 8B. The magnet 22 inserted into the magnet insertion hole 24 is pressed against the inner surface of the magnet insertion hole 24 on an opposite side of the contact portion 53, with the magnet 22 in between, by the elastic restoring force of the contact portion 53. As a result, the magnet 22 is fixed with respect to the magnet insertion hole 24.

That is, the rotor 2 for the motor 1 according to this embodiment having the above configuration includes a cylindrical rotor core 21, having multiple core plates 25 laminated in a thickness direction and a magnet insertion hole 24 extending in an axial direction, and a magnet 22 inserted into the magnet insertion hole 24. The core plates 25 of the rotor 2 have multiple first core plates 50. The first core plates 50 are continuously laminated in the axial direction. Each of the first core plates 50 includes a contact portion 53 and a deformation permitting portion 52. The contact portion 53 defines a portion of an inner surface of the magnet insertion hole 24 and contacts with the magnet 22. The deformation permitting portion 52 is located on an opposite side of the magnet 22 with the contact portion 53 in between when the first core plates 50 are viewed in the thickness direction, and permits deformation of the contact portion 53. Multiple contact portions 53 of the first core plates 50 are at least partially overlapped when the rotor core 21 is viewed in the axial direction.

The core plate has a contact portion that is deformed by a magnet inserted into a magnet insertion hole in a direction that intersects an insertion direction of the magnet, and a rotor in which the magnet is held within the magnet insertion hole by the elastic restoring force of the contact portion is known. In the rotor, the contact portion is deformed by the magnet in a direction that intersects the insertion direction when the magnet is inserted into the magnet insertion hole. The contact portion is pressed in the insertion direction of the magnet when the magnet is inserted into the magnet insertion hole. Accordingly, the contact portion may also be deformed in the insertion direction. As a result, the force of the contact portion pressing the magnet in the direction that intersects the insertion direction may be reduced.

On the other hand, in the rotor 2 according to this embodiment, the contact portion 53 may be easily deformed toward the deformation permitting portion 52. Further, the contact portions 53 that contact the magnet 22 are at least partially overlapped when the rotor core 21 is viewed in the axial direction. That is, the contact portion 53 is easily deformed in a direction that intersects with the axial direction and is less easily deformed in the axial direction. In this way, the decrease in the force of the contact portion 53 to press the magnet 22 is suppressed. Thus, a rotor that may hold the magnet 22 within the magnet insertion hole 24 with a simple configuration is provided.

Each of the first core plates 50 of the rotor 2 includes multiple contact portions 53 and deformation permitting portions 52. In this way, one magnet 22 may be held by multiple contact portions 53 per first core plate 50. As a result, the magnet 22 may be held within the magnet insertion hole 24 more reliably.

The motor 1 according to this embodiment includes a rotor 2 and a stator 3 having a stator coil 32 and a stator core 31. As a result, the motor 1 having a rotor capable of holding the magnet 22 within the magnet insertion hole 24 with a simple configuration is provided.

Figure 9:
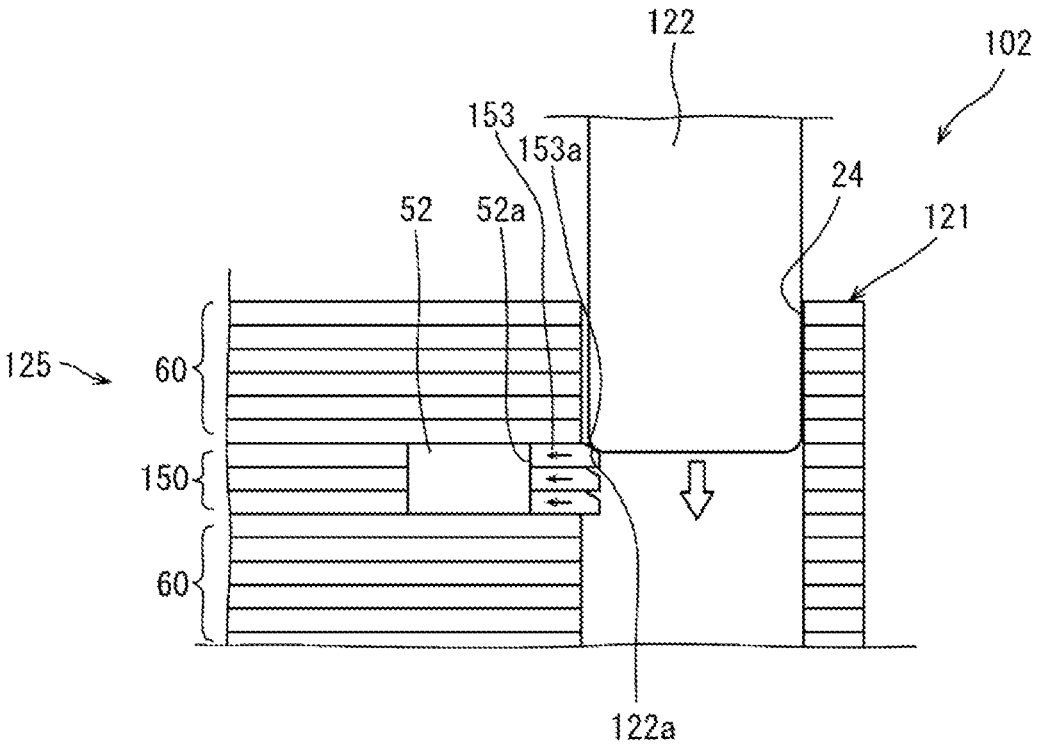
FIG. 9 is a view equivalent to FIG. 8A of the motor according to a modification of the first exemplary embodiment.

Next, with reference to FIG. 9, a motor according to a modification of the first exemplary embodiment is described. In the rotor 102 of the motor according to this modification, the configuration of the first core plate 150 that defines the magnet 122 and the rotor core 121 is different from that of the rotor 2 according to the first exemplary embodiment. The other configurations are the same as the first exemplary embodiment. In the following, the same components as in the first exemplary embodiment are denoted by the same reference numerals, and the description thereof will be omitted.

In this modification, the rotor 102 includes a rotor core 121 and a magnet 122. The rotor core 121 has a magnet insertion hole 24. The magnet 122 is inserted into the magnet insertion hole 24 from one side in the axial direction of the rotor 102 and is accommodated in the magnet insertion hole 24.

The rotor core 121 has multiple core plates 125. The core plates 125 include a first core plate 150 and a second core plate 60. The first core plate 150 has multiple accommodation holes 51, multiple deformation permitting portions 52, and multiple contact portions 153.

In this modification, the magnet 122 has a curved surface 122a at a corner located on the front side of the magnet insertion direction. The contact portion 153 of the first core plate 150 has an inclined surface 153a located at the tip protruding toward the interior of the magnet insertion hole 24 and contacting the magnet 122 when the magnet 122 is inserted into the magnet insertion hole 24. As a result, when inserting the magnet 122 into the magnet insertion hole 24, the contact portion 153 may be easily deformed toward the deformation permitting portion 52.

It should be noted that the magnet may also have a curved surface at the corner on the rear side of the magnet insertion direction. The contact portion of the first core plate may also have an inclined surface on the side opposite to the side that contacts the magnet when the magnet is inserted into the magnet insertion hole 24.

Although the embodiments of the present invention have been described above, the embodiment described above is merely an example for implementing the present invention. Thus, without being limited to the embodiment described above, the embodiment described above may be modified and implemented as appropriate within a range without departing from the spirit thereof.

In the above embodiment, the deformation permitting portion 52 is located at the radially inner side with respect to the accommodation hole 51. However, the deformation permitting portion only needs to be located on the opposite side of the magnet with the contact portion in between with respect to the accommodation hole. In other words, for the accommodation hole that defines a portion of the magnet insertion hole that extends in the radial direction of the rotor core when viewed from the axial direction, the deformation permitting portion may be located on one side or the other side in the circumferential direction of the first core plate.

In the above embodiment, the rotor core 21 has multiple first core plates continuously laminated in the center of the axial direction of the rotor core 21. However, the rotor core may have multiple first core plates that are continuously laminated on one side or the other side than the center of the axial direction. The rotor core may have multiple first core plates that are continuously laminated at multiple positions in the axial direction.

In the above embodiment, the first core plate 50 has two deformation permitting portions 52 for one accommodation hole 51. However, the first core plate may have one, three, or more than three deformation permitting portions for one accommodation hole.

In the above embodiment, the first core plate 50 has a deformation permitting portion 52 for all accommodation holes 51. However, the first core plate may have a deformation permitting portion for some accommodation holes.

In the above embodiment, the first core plate 50 has a contact portion 53 for all accommodation holes 51. However, the first core plate may have a contact portion for some accommodation holes.

In the above embodiment, the first core plate 50 has one deformation permitting portion 52 for one contact portion 53. However, the number of contact portions may be different from the number of deformation permitting portions.

In the above embodiment, the deformation permitting portion 52 has a through hole 52a. However, the deformation permitting portion may, for example, have a thin portion at the position of the through hole. The deformation permitting portion may have any configuration that permits the deformation of the contact portion when the magnet is inserted into the magnet insertion hole.

In the above embodiment, the through hole 52a of the deformation permitting portion 52 has a rectangular shape. However, the through hole of the deformation permitting portion may have a shape other than a rectangle. The through hole may have any shape capable of deforming the contact portion into the arrangement direction of the contact portion and the deformation permitting portion.

In the above embodiment, the deformation permitting portions 52 have the same shape. However, some deformation permitting portions may have different shapes.

In the above embodiment, the contact portion 53 has a protrusion 53a. However, the contact portion contacts the magnet inserted into the magnet insertion hole and may have any shape capable of being pressed by the magnet and deformed toward the deformation permitting portion when the magnet is inserted into the magnet insertion hole. For example, the contact portion may have a protrusion in which a certain range of the inner surface of the magnet insertion hole protrudes in the interior of the magnet insertion hole.

In the above embodiment, in the axial direction of the rotor 2, multiple second core plates 60 are laminated on one side and the other side of the first core plates 50, respectively. However, some of the core plates laminated on the one side and the other side of the axial direction of the first core plates may be the second core plates.

In the modification of the first exemplary embodiment, the magnet 122 has a curved surface 122a at the connection portion between an end surface of the magnet insertion direction among the end surfaces in the axial direction and the side surface extending in the longitudinal direction of the magnet 122. However, the magnet may have an inclined surface at the connection portion.

In the modification of the first exemplary embodiment, the contact portion 153 of the first core plate 150 has an inclined surface 153a at the tip that protrudes toward the interior of the magnet insertion hole 24. However, the contact portion of the first core plate may have a curved surface at the tip.

The present invention may be used in a rotor of an IPM motor, for example.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor, comprising:

a cylindrical rotor core, having a plurality of core plates laminated in a thickness direction and a magnet insertion hole extending in an axial direction; and a magnet, inserted into the magnet insertion hole, wherein the core plates comprise a plurality of first core plates, the first core plates are continuously laminated in the axial direction, each of the first core plates comprises:

a contact portion, defining a portion of an inner surface of the magnet insertion hole and contacting the magnet; and a deformation permitting portion, located on an opposite side of the magnet with the contact portion in between when the first core plates are viewed in the thickness direction, and permitting deformation of the contact portion, and a plurality of the contact portions of the first core plates are at least partially overlapped when the rotor core is viewed in the axial direction, wherein the core plates comprise a second core plate laminated on at least one side of a laminating direction of the first core plates with respect to the first core plates, wherein an inner surface of the second core plate defines the magnet insertion hole on a side of the inner surface of the first core plate, and the inner surface of the second core plate is not in contact with the magnet.

2. The rotor according to claim 1, wherein the second core plate comprises:

a covering portion, located at a position overlapping the deformation permitting portion of the first core plates when viewed in the laminating direction.

3. The rotor according to claim 2, wherein the contact portion comprises a protrusion that protrudes from an inner surface of the magnet insertion hole toward an interior of the magnet insertion hole.

4. The rotor according to claim 2, wherein the deformation permitting portion comprises a through hole that penetrates each of the first core plates.

5. The rotor according to claim 2, wherein a length of the deformation permitting portion is longer than the contact portion in a crossing direction perpendicular to an arrangement direction of the contact portion and the deformation permitting portion when the rotor is viewed in the axial direction.

6. The rotor according to claim 1, wherein the contact portion comprises a protrusion that protrudes from an inner surface of the magnet insertion hole toward an interior of the magnet insertion hole.

7. The rotor according to claim 6, wherein a length of the deformation permitting portion is longer than the contact portion in a crossing direction perpendicular to an arrangement direction of the contact portion and the deformation permitting portion when the rotor is viewed in the axial direction.

8. The rotor according to claim 1, wherein the deformation permitting portion comprises a through hole that penetrates each of the first core plates.

9. The rotor according to claim 8, wherein a length of the deformation permitting portion is longer than the contact portion in a crossing direction perpendicular to an arrangement direction of the contact portion and the deformation permitting portion when the rotor is viewed in the axial direction.

10. The rotor according to claim 1, wherein a length of the deformation permitting portion is longer than the contact portion in a crossing direction perpendicular to an arrangement direction of the contact portion and the deformation permitting portion when the rotor is viewed in the axial direction.

11. The rotor according to claim 1, wherein each of the first core plates comprises:

a plurality of the contact portions; and a plurality of the deformation permitting portions.

12. An interior permanent magnet motor, comprising:

the rotor according to claim 1; and a stator, having a stator coil and a stator core.

13. The rotor according to claim 1, wherein a surface of the magnet is not in contacted with the inner surface of the second core plate along the axial direction, which is a pressing direction that the magnet is inserted into the magnet insertion hole.

* * * * *